US009476364B2

(12) United States Patent
Ruhland et al.

(10) Patent No.: US 9,476,364 B2
(45) Date of Patent: *Oct. 25, 2016

(54) INTERNAL COMBUSTION ENGINE HAVING A PLURALITY OF EXHAUST PORTS PER CYLINDER AND CHARGE EXCHANGE METHOD FOR SUCH AN INTERNAL COMBUSTION ENGINE

(71) Applicant: Ford Global Technologies, LLC, Dearborn, MI (US)

(72) Inventors: Helmut Hans Ruhland, Eschweiler (DE); Jens Dunstheimer, Cologne (DE); Albert Breuer, Cologne (DE); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/527,641

(22) Filed: Oct. 29, 2014

(65) Prior Publication Data

US 2015/0047584 A1 Feb. 19, 2015

Related U.S. Application Data

(62) Division of application No. 13/651,178, filed on Oct. 12, 2012, now Pat. No. 8,875,675.

(30) Foreign Application Priority Data

Oct. 20, 2011 (DE) .......................... 10 2011 084 834

(51) Int. Cl.
*F01L 1/34* (2006.01)
*F02D 13/02* (2006.01)
(Continued)

(52) U.S. Cl.
CPC ........... *F02D 13/0246* (2013.01); *F01N 13/10* (2013.01); *F02D 13/00* (2013.01);
(Continued)

(58) Field of Classification Search
CPC .... F02D 13/00; F02D 13/02; F02D 13/0246; F02D 13/0249; F02D 13/0257
USPC .................................... 123/90.15, 90.17, 315
See application file for complete search history.

(56) References Cited

U.S. PATENT DOCUMENTS

| 4,068,630 | A | 1/1978 | Bennett et al. |
| 5,239,960 | A | 8/1993 | Sasaki et al. |
| 6,397,802 | B1 | 6/2002 | Rutschmann et al. |
| 6,647,935 | B2 * | 11/2003 | Aoyama ................. F01L 1/024 123/198 F |
| 8,069,663 | B2 | 12/2011 | Ulrey et al. |

(Continued)

FOREIGN PATENT DOCUMENTS

| DE | 19954689 A1 | 5/2001 |
| EP | 1612389 A2 | 1/2006 |

OTHER PUBLICATIONS

Partial Translation of Office Action of Chinese Application No. 2012104051060, Issued Jan. 25, 2016, State Intellectual Property Office of PRC, 10 Pages.

*Primary Examiner* — Ching Chang
(74) *Attorney, Agent, or Firm* — Julia Voutyras; Alleman Hall McCoy Russell & Tuttle LLP (57) ABSTRACT

A method for controlling valve actuation in an engine is provided. The method includes initiating combustion operation in a first cylinder, opening, via a first cam, a first exhaust valve coupled to the first cylinder for a first opening duration. The method further includes opening, via a second cam, a second exhaust valve coupled to the first cylinder for a second opening duration not equivalent to the first opening duration.

18 Claims, 3 Drawing Sheets

(51) Int. Cl.
  *F02D 13/00*  (2006.01)
  *F01N 13/10*  (2010.01)
  *F02D 41/00*  (2006.01)

(52) U.S. Cl.
  CPC ......... *F02D 13/02* (2013.01); *F02D 13/0257* (2013.01); *F02D 13/0249* (2013.01); *F02D 2041/001* (2013.01); *Y02T 10/18* (2013.01)

(56) References Cited

U.S. PATENT DOCUMENTS 8,875,675 B2 * 11/2014 Ruhland ................ F02D 13/00
  123/315
2010/0242472 A1   9/2010 Elsässer et al.

* cited by examiner

INTERNAL COMBUSTION ENGINE HAVING A PLURALITY OF EXHAUST PORTS PER CYLINDER AND CHARGE EXCHANGE METHOD FOR SUCH AN INTERNAL COMBUSTION ENGINE

CROSS REFERENCE TO RELATED APPLICATIONS

The present application is a divisional of U.S. patent application Ser. No. 13/651,178, entitled "INTERNAL COMBUSTION ENGINE HAVING A PLURALITY OF EXHAUST PORTS PER CYLINDER AND CHARGE EXCHANGE METHOD FOR SUCH AN INTERNAL ENGINE," filed Oct. 12, 2012, which claims priority to German Patent Application No. 102011084834.7, filed Oct. 20, 2011, the entire contents of each which are hereby incorporated by reference for all purposes.

FIELD

The present disclosure relates to a valve actuation assembly and a method for actuating valves in an internal combustion engine.

BACKGROUND AND SUMMARY

Internal combustion engines include a cylinder head and cylinder block connected to form cylinders. The engine may include intake valves positioned in intake ports. The intake valves may be used to provide the cylinder with air. The engine may further include exhaust valves positioned in exhaust ports. The exhaust valves are used to flow combustion gasses away from the cylinders.

A higher degree of throttling may be used when the engine has a low load. When throttling is increased engine efficiency is decreased and specifically charge exchange losses are increased. In order to increase engine efficiency and reduce the throttling losses, different strategies for load control have been developed.

For example, variable valve timing may be used in engines to enable the timing of the intake and/or exhaust valves to be advanced or retarded. Variable valve timing may enable an increase in engine efficiency. Attempts have been made to vary the valve timing using a camshaft adjusting device with which the camshaft can be rotated through a given angle with respect to the crankshaft, so that the control times can be advanced or retarded, without the ability to independently vary the opening and closing durations of the valves. Therefore, crankshaft adjustment devices displace the opening time and the closing time by the same crank angle amount in the same direction. The intake and/or exhaust valves may be advanced or retarded such that valve overlap occurs across different cylinders. That is to say, the intake valve in one cylinder is open while the exhaust valve in another cylinder is also open. Valve overlap may lead to cylinder cross-talk. As a result, engine efficiency may be decreased. Cylinder cross-talk may be exacerbated in cylinder heads having exhaust manifold integrated therein and/or shortened exhaust manifold used to reduce losses in turbocharged systems.

The Inventors herein have recognized at least some of the above issues and developed a method for controlling valve actuation in an engine is provided. The method includes initiating combustion operation in a first cylinder, opening, via a first cam, a first exhaust valve coupled to the first cylinder for a first opening duration. The method further includes opening, via a second cam, a second exhaust valve coupled to the first cylinder for a second opening duration not equivalent to the first opening duration.

The variation in the opening durations reduces cross-talk between combusted cylinders. In one example, the first opening duration is longer than the second opening duration and the first exhaust valve is closer to a precedingly combusted cylinder than the second exhaust valve, the precedingly combusted cylinder directly preceding the combustion in the first cylinder in the firing order. In this way, the opening duration of an exhaust valve closer to a previously combusted cylinder is shortened to reduce the likelihood of cross-talk between the cylinders. As a result, combustion efficiency is improved, thereby improving the engine's efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

The internal combustion engine is described in greater detail below with reference to the illustrative examples shown in FIGS. 1-2.

DETAILED DESCRIPTION

An internal combustion engine is described herein. In some examples, the engine may have valve overlap, that is, the crank angle range within which the exhaust is not yet closed with the inlet open, may be varied by variable cam timing. Therefore, variable valve timing may be used in the engine described herein. Variable valve timing makes possible a variation of valve overlap as a function, inter alia, of engine speed, if desired.

In previous engines during the valve overlap period, scavenging losses may occur for example, under heavy loads. Thus, a part of the aspirated fresh air may flow through the cylinder without participating in combustion.

To reduce scavenging losses, the engine described herein may be boosted via a turbocharger. In such an example, a large valve overlap at low revolutions is capable of significantly increasing maximum torque and improving non-stationary operating behavior, if desired. A pressure drop present between the inlet side and the exhaust side at low revolutions may promote effective scavenging of the cylinders with fresh air and may enable improved cylinder filling and therefore higher power.

Additionally, a large valve overlap, or late closing of exhaust valves, may also reduce the pumping work and therefore the charge exchange losses in part-load operation in the engine. With regard to charge exchange, shorter exhaust lines leading from the cylinders may lead to cylinder cross-talk during valve overlap. The exhaust lines may be shortened to integrate the exhaust manifold into the cylinder head and provide cooling to the manifold via the engine cooling system. Integrating the exhaust manifold into the cylinder head may reduce the cost of the engine. It will be appreciated that exhaust manifold external to the cylinder head may be constructed out of materials with a high thermal resistance, which may increase the cost of the engine. Additionally, the short exhaust gas lines can have the result that the cylinders of the internal combustion engine influence one another adversely during the charge exchange, and in particular that the effect achieved by residual gas scavenging may be at least partly nullified, in some examples. However, the valve timing strategy of the engine described herein may reduce the likelihood of combustion in adjacent cylinders influencing one another.

Without using the exhaust valve timing strategy described herein, in the case of a four-cylinders-in-line engine the cylinders of which are operated with the firing order 1-3-4-2, the fourth cylinder, for example, can adversely influence the third cylinder preceding it in the firing order, that is, the cylinder ignited previously, during the charge exchange, and exhaust gas coming from the fourth cylinder can enter the third cylinder before its exhaust valves close. In this case the evacuation of the combustion gases from the fourth cylinder may depend on two different mechanisms. When an exhaust valve opens at the start of the charge exchange, the combustion gases may flow at high velocity through the exhaust port into the exhaust gas line, because of the high pressure level prevailing in the cylinder towards the end of combustion and the associated high pressure difference between combustion chamber and exhaust system. This pressure-driven flow process may be stronger the higher the torque delivered, and may be accompanied by a high pressure spike, also referred to as a pre-exhaust impulse, which may be propagated along the exhaust gas line. In the further course of the charge exchange, the pressures in the cylinder and in the exhaust gas line may be largely equalized, so that the combustion gases are now expelled as a result of piston movement. The exhaust gases coming from the fourth cylinder and introduced into the third cylinder may be undesirable. To counter these problems resulting from the short exhaust gas lines the opening duration of the exhaust valves or of the exhaust ports may be shortened, that is, the exhaust valve is opened later or closed earlier. In order to exploit further the advantages of large valve overlap, at low revolutions the exhaust valve may be opened later while the closing time is retained. This measure therefore permits an improvement in the torque characteristic curve at low revolutions. Because of the shortened opening duration of the exhaust valves, however, disadvantages may be incurred regarding power at high revolutions and regarding the reduction in pumping work in part-load operation in order to reduce fuel consumption.

In the engine described herein, valve actuating assemblies may be used to initiate opening and closing of the intake and exhaust valves at desired time intervals. The valve actuating assemblies may include a camshaft having a plurality of cams configured to actuate the intake and/or exhaust valves. The cam-shafts may be overhead camshafts or side-mounted camshafts.

It may be desirable to increase the flowrate of the intake air into the cylinder as well as the flowrate of the exhaust gas out of the cylinder to increase combustion efficiency. To increase the aforementioned flowrates, each cylinder may be equipped with two or more intake and exhaust valves. The power output of the engine may be controlled by a throttle valve positioned in the engine's intake system. The throttle valve may be adjusted to alter the pressure of the aspirated air downstream of the throttle valve and therefore the cylinder. In this way, the quantity of air (e.g., air mass) provided to the cylinder can be adjusted to alter the engine's power output.

Furthermore, the engine described herein may be a spark ignition engine. The engine may include at least one cylinder head which includes at least two cylinders arranged in line, in which each cylinder has at least two exhaust ports for discharging the exhaust gases from the cylinder, each exhaust port being equipped with an exhaust valve which may be controllable by a valve actuating arrangement and which opens or closes the exhaust port, an exhaust gas line adjoins each exhaust port, and the exhaust gas lines of at least two cylinders are brought together to provide a combined exhaust gas line while forming an exhaust manifold.

A method for controlling a spark ignition internal combustion engine is also described herein. An internal combustion engine of the type previously mentioned may be used as a drive means for motor vehicles. The internal combustion engine may be an Otto type spark ignition engine, in one example.

The engine described herein may enable valve overlap during for example, low engine speeds, while reducing the cross-talk between cylinders. The valve overlap and cross-talk reduction may also be achieved without increasing pumping work during part-load operation and/or decreasing the engine's power output at large engines speeds, in some examples, if desired.

The internal combustion engine described herein may also increase (e.g., optimize) charge exchange. In one example, a spark-ignition internal combustion engine having at least one cylinder head which includes at least two cylinders arranged in line is provided. In the engine each cylinder may have at least two exhaust ports for discharging the exhaust gases from the cylinder, each exhaust port may be equipped with an exhaust valve which may be controllable by a valve actuating arrangement and which opens or closes the exhaust port. The engine may also include an exhaust gas line adjoining each exhaust port and the exhaust gas lines of at least two cylinders may be brought together to provide a combined exhaust gas line while forming an exhaust manifold. Additionally, the at least two exhaust ports of each cylinder may have opening durations of different lengths, the exhaust port which may be oriented towards and adjacent (e.g., closest) to the preceding cylinder in the firing order having the shorter opening duration $\Delta_{short}$, and the exhaust port which is oriented away from and is arranged further from the preceding cylinder in the firing order having the longer opening duration $\Delta_{long}$.

In some examples, in the internal combustion engine not all the exhaust ports of a cylinder may be operated with a shortened opening duration to reduce (e.g., prevent) reciprocal influence of the cylinders during the charge exchange. The opening length of the exhaust ports may be determined based on anticipated cross-talk interference between the cylinders.

The internal combustion engine may have at least two exhaust ports arranged at different distances from the preceding cylinder in the firing order, that is from the cylinder ignited previously, or from the exhaust ports in the cylinder head of that cylinder.

The exhaust port of the cylinder which is oriented towards and adjacent (e.g., closest) to the preceding cylinder in the firing order may be the exhaust port the exhaust gas of which has the shortest path via the exhaust system to this preceding cylinder in the firing order. This adjacent (e.g., closest) exhaust port may be an important exhaust port with regard to charge exchange, therefore may be operated with a shorter opening duration $\Delta_{short}$.

The other exhaust port, which is oriented away from and is arranged further from the preceding cylinder in the firing order, may be operated with a longer opening duration $\Delta_{long}$. This longer opening duration $\Delta_{long}$ is not disadvantageous, since the exhaust gases exiting through this exhaust port arranged further away covers a longer distance via the exhaust system in order to reach the preceding cylinder in the firing order. Consequently, the exhaust port further away can be opened earlier and/or closed later than the port oriented towards the cylinder ignited previously, if desired.

In this way, the opening duration of only one exhaust port and exhaust valve of each cylinder may be shorted and at least one additional exhaust port and exhaust valve of each cylinder may be opened for a longer duration, if desired. It will be appreciated that the exhaust port and exhaust valve opened for a longer duration may increase power output at higher engine speeds and pump work, during for example, partial load conditions, may be decreased. In this way, an internal combustion engine with which, in particular, the advantages of a large valve overlap can be achieved at low revolutions without decreasing power output at high engine speeds and the increasing pumping work during part-load operation.

The internal combustion engine may also increase (e.g., optimize) charge exchange. The opening durations of different lengths of the at least two exhaust ports of each cylinder may be implemented, for example, in that the two associated exhaust valves are actuated by different cams, that is, by cams having different contours. Further in some examples, the internal combustion engine may include at least two exhaust ports of each cylinder having the same closing duration.

The exhaust valve closing duration may set the valve overlap. The valve closing time may be adjusted with regard to scavenging of the cylinders and reducing the pumping work in part-load operation. Consequently it may not be desirable to close the at least two exhaust ports of a cylinder at different control times, that is, to close one exhaust port while the other exhaust port continues to be open. Such a procedure may not end discharge of exhaust gas from the cylinder, but may reduce the total flow cross section of the exhaust. This may increase the throttling losses in the exiting exhaust gas flow, and in particular may run counter to effective scavenging of the cylinders. Therefore, the at least two exhaust ports and exhaust valves of each cylinder may be operated with the same closing time. The exhaust port located further away, that is the exhaust port with the longer opening duration $\Delta_{long}$, may be opened earlier than the exhaust port oriented towards the cylinder ignited previously, which has the shorter opening duration $\Delta_{short}$.

Additionally in some examples, the at least two exhaust ports of each cylinder may have an offset $\Delta$ with respect to the opening times. Therefore in some examples the offset may be, $2°$ KW$<\Delta \leq 10°$ KW. Further in some examples, the offset may be $10°$ KW$<\Delta \leq 15°$ KW or $15°$ KW$<\Delta >25°$ KW.

How large the offset $\Delta$, or the difference between the shorter opening duration $\Delta_{short}$ and the longer opening duration $\Delta_{long}$, is selected to be in the individual case may depend on a large number of influence factors, in particular the number of cylinders the exhaust gas lines of which are brought together to form a manifold, the firing order of these cylinders and the lengths of the individual exhaust gas lines adjoining the exhaust ports.

Further in some examples, the internal combustion engine may include exhaust gas lines of the at least two cylinders brought together to provide a combined exhaust gas line inside the at least one cylinder head while forming an integrated exhaust manifold. Additionally in some examples, the exhaust gas lines in the internal combustion engine may be brought together in groups inside and/or outside the at least one cylinder head to provide a plurality of combined exhaust gas lines while forming at least two exhaust manifolds.

Further in some examples, the internal combustion engine having the exhaust gas lines of the at least two cylinders may be brought together to provide a combined exhaust gas line while forming an exhaust manifold integrated at least partially in the at least one cylinder head.

As already mentioned, through the integration of the exhaust manifold in the cylinder head highly heat resistant materials for producing the manifold can be saved, whereby the production costs can be reduced, if desired. Additionally, the integration of the exhaust manifold in the cylinder head also has advantages with regard to the turbine of an exhaust gas turbocharger arranged in the exhaust gas discharge system and with regard to the exhaust gas after-treatment systems used. To increase the efficiency of a turbine in a turbocharger and/or provide exhaust gases to an emission control device at a desirable temperature the exhaust ports may be positioned close to the turbine. As a result, the efficiency of the engine is increased and the response of the turbocharger is also increased. Furthermore, hot exhaust gases delivered to an emission control device may enable the emission control device to reach a light-off temperature quickly after a cold start.

In this context, therefore, it may be desirable to reduce the thermal inertia of the partial section of the exhaust gas line between the exhaust port on the cylinder and exhaust gas after-treatment systems, or between the exhaust port on the cylinder and the turbine of the exhaust gas turbocharger, which can be achieved by reducing the mass and length of this partial section, but also by reducing the heat-transmitting area of the manifold. The integration of the manifold into the cylinder head may also be beneficial in this respect.

The integration of the manifold into the cylinder head may also shortens the overall distance covered by all the exhaust gas lines and makes possible a compact, less bulky structure of the internal combustion engine, a weight reduction, and effective packaging of the drive unit in the engine compartment. A cylinder head configured in this way may be more thermally stressed than a cylinder head equipped with an external manifold, and therefore may places higher demands on the cooling. Therefore, liquid cooling may be provided to the cylinder head.

The internal combustion engine may include a cylinder head having four cylinders arranged in line, the firing points of the cylinders may have an interval of 180° with respect to crank angle, in some examples. The configuration may be beneficial with a four-cylinders-in-line engine, since the opening duration of an exhaust valve may exceed 200° with respect to crank angle. In some examples, the opening duration of the exhaust valve may extend over 230° with respect to crank angle, although the four cylinders may be ignited at intervals of 180° with respect to crank angle. Therefore, the cylinders and specifically the exhaust ports may be operated so to reduce influence on one another during charge exchange. Therefore, different opening durations of the exhaust valves may be beneficial in this respect.

In some examples, the internal combustion engine may include a boosting device. For instance, an exhaust gas turbocharger and/or a supercharger may be used as the boosting device. An exhaust gas turbocharger may include a compressor and a turbine arranged on a shaft. The hot exhaust gas flow may be supplied to the turbine and decompresses in the turbine while releasing energy, whereby the shaft is set in rotation. The energy from the exhaust gas flow delivered to the turbine and to the shaft is used to drive the compressor also arranged on the shaft. The compressor pumps and compresses the charge air supplied to it, whereby boosting of the charge to the cylinders is achieved. Charge air cooling, with which the compressed combustion air is cooled before entering the cylinders, may also be provided.

The boosting device may increase the power of the internal combustion engine. The air for the combustion process is compressed via the boosting device. As a result, a larger air mass per working cycle can be supplied to each cylinder. The fuel mass and therefore the mean effective pressure can be increased, if desired. Boosting may be provided to increase the power output of the engine without increasing the engine's displacement, if desired. The boosting may lead to an improved power-to-space ratio and a more favorable power-to-mass ratio. With similar operating conditions of the vehicle, therefore, the load spectrum may be shifted towards higher loads, at which the specific fuel consumption may be lower, if desired.

The torque characteristic curve of a boosted internal combustion engine may be improved by various measures—for example, by designing the turbine cross section to be small and simultaneously blowing off the exhaust gas, but also by using a plurality of exhaust gas turbochargers with turbines arranged in parallel or in series.

In the case of internal combustion engines having a valve actuating arrangement which includes an exhaust camshaft, examples in which the phase between a crankshaft and the exhaust camshaft are adjustable may be used, if desired.

Camshaft adjustment whereby the exhaust camshaft is rotated by a given angle with respect to the crankshaft, that is, is phase-adjusted, so that the timing is advanced or retarded, offers a possibility of adjusting the timing of the exhaust valves. The opening duration of the valves remains unchanged. Rotation of the exhaust camshaft permits a variation of valve overlap, especially as a function of the rotational speed of the internal combustion engine.

In some examples, the internal combustion engine may also have a valve actuating arrangement configured to adjust the timing of the intake valves. Specifically, camshaft adjustment via the valve actuating arrangement whereby the intake camshaft is rotated by a given angle with respect to the crankshaft, that is, is phase-adjusted, so that the timing is advanced or retarded, may be provided.

Further in some examples, the engine may provide direction injection to one or more cylinders. The injection of fuel directly into the combustion chamber of the cylinder may reduce fuel consumption of spark-ignition engines, if desired, when comparted to port injection. However, port injection may be used in the internal combustion engine if desired.

Direct injection may cool the air-fuel mixture in the combustion chamber. As a result, higher compression and/or boosting may be used without premature self-ignition (e.g., knocking) of the air-fuel mixture, if desired.

In addition, direct injection of the fuel into the combustion chamber may enable stratified charging of the combustion chamber if desired, which may contribute to de-throttling the operation of the spark-ignition engine, since the engine may be lean with the aid of stratified charging. This may achieve thermodynamic benefits especially in part-load operation, that is, in the lower and medium load range when only small quantities of fuel may be injected if desired.

Further in some examples, each cylinder in the internal combustion engine may have at least two intake ports for supplying fresh air or fresh mixture to the cylinder. The intake ports may be referred to as inlet ports. Additionally, each intake port may be equipped with an intake valve (e.g., inlet valve) which may be controllable by a valve actuating assembly. The valve actuating assembly may be referred to as a valve actuating arrangement. The valve actuating assembly may be configured to open and close the intake valves.

Furthermore, a method for increasing (e.g., optimizing) charge exhaust of a spark-ignition internal combustion engine having at least one cylinder head which includes at least two cylinders arranged in an in-line is also disclosed herein. Each of the cylinders in the engine may have at least two exhaust ports for discharging the exhaust gases from the cylinder, each exhaust port may be equipped with an exhaust valve which is controllable by a valve actuating assembly (e.g., valve actuating arrangement) and which opens or closes the exhaust ports. Additionally, the engine may include exhaust gas lines adjoining each exhaust port, in some examples. Further in some examples, the exhaust gas lines of at least two cylinders are brought together to provide a combined exhaust gas line while forming an exhaust manifold. Additionally in some examples, the at least two exhaust ports of each cylinder may be opened for different durations, specifically in such a way that the exhaust port which is oriented towards and closest to the preceding cylinder in the firing order is opened for a shorter duration $\Delta_{short}$ than the exhaust port which is oriented away from and is arranged further from the preceding cylinder in the firing order and is opened for a longer duration $\Delta_{long}$. For the offset $\Delta$ the following ranges may be used: 2° KW<$\Delta$≤10° KW, 10° KW<$\Delta$≤15° KW or 15° KW<$\Delta$≤25° KW.

Figure 1:
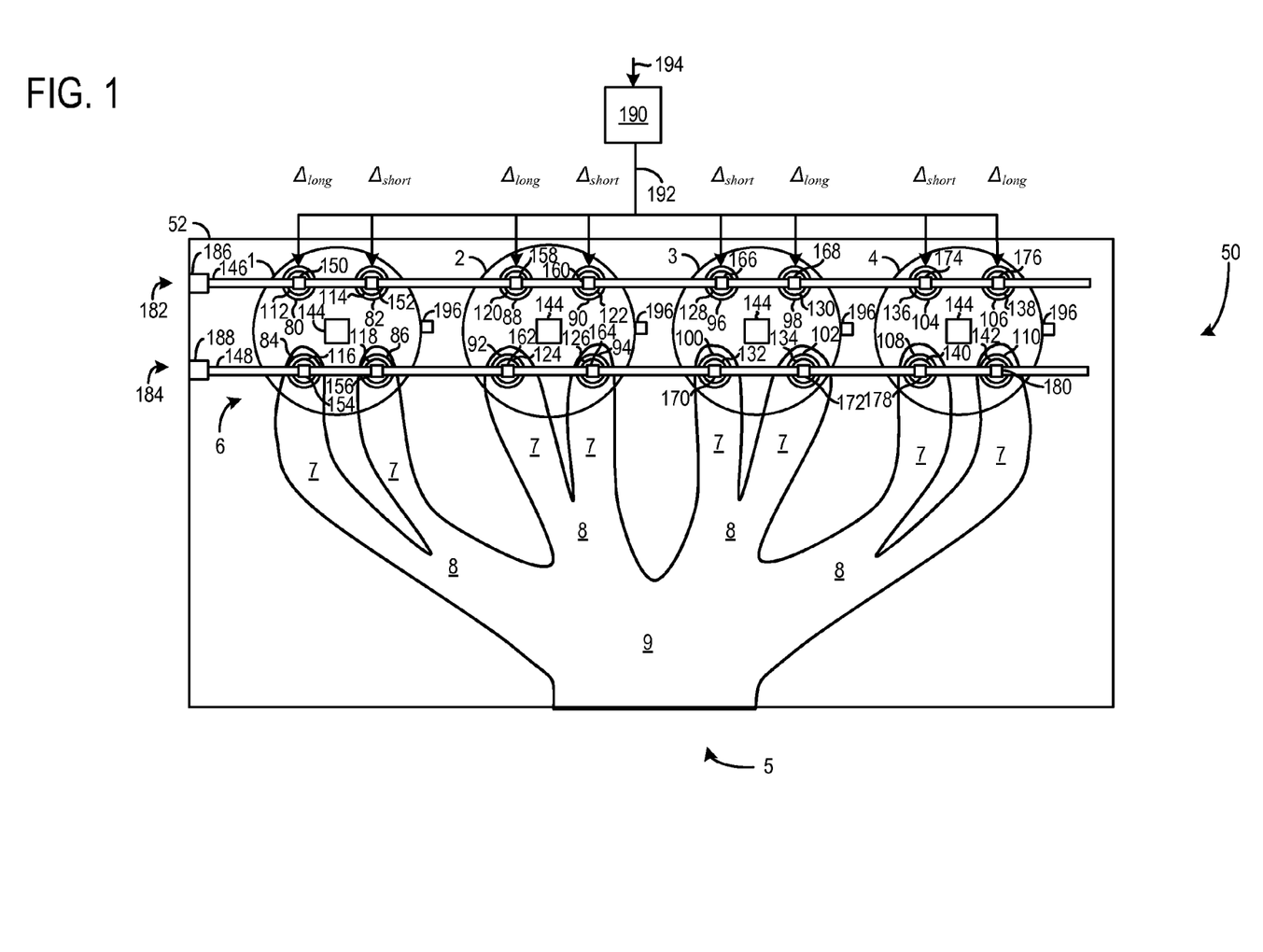
FIG. 1 shows schematically an internal combustion engine including cylinder head.

FIG. 1 shows an example internal combustion engine 50 including a cylinder head 52. The cylinder head 52 includes a first cylinder 1, a second cylinder 2, a third cylinder 3, and a fourth cylinder 4. The engine 50 may be configured to implement a four stroke combustion cycle in each of the cylinders. It will be appreciated that a cylinder block may be coupled to the cylinder head 52 to form the cylinders. Each of the cylinders (1, 2, 3, and 4) may include two exhaust ports and two intake ports. Thus, the first cylinder 1 includes a first intake port 80, a second intake port 82, a first exhaust port 84, and a second exhaust port 86. Additionally, the second cylinder 2 may includes a first intake port 88, a second intake port 90, a first exhaust port 92, and a second exhaust port 94. Likewise, the third cylinder 3 may include a first intake port 96, a second intake port 98, a first exhaust port 100, and a second exhaust port 102. The exhaust ports are generally shown at 6. The fourth cylinder 4 may include a first intake port 104, a second intake port 106, a first exhaust port 108, and a second exhaust port 110.

Additionally, each of the cylinders may include an exhaust valve positioned in each exhaust port and an intake valve positioned in each intake port. Thus, the intake and exhaust valves may be coupled to the cylinders. The exhaust valves are configured to open and close. That is to say, that each exhaust valve is configured to permit exhaust gas to flow into a corresponding exhaust line from a corresponding cylinder in an open configuration and inhibit exhaust gas from flowing into the exhaust line from the cylinder in a closed configuration. Likewise, the intake valves are configured to open and close. Therefore, the first cylinder 1 may include a first intake valve 112, a second intake valve 114, a first exhaust valve 116, and a second exhaust valve 118. Additionally, the second cylinder 2 may include a first intake valve 120, a second intake valve 122, a first exhaust valve 124, and a second exhaust valve 126. The third cylinder 3 may include a first intake valve 128, a second intake valve 130, a first exhaust valve 132, and a fourth exhaust valve 134. The fourth cylinder 4 may include a first intake valve 136, a second intake valve 138, a first exhaust valve 140, and a second exhaust valve 142. Each of the cylinders may also include an ignition device 144 (e.g., spark plug). It will be appreciated that the intake and/or exhaust valves may be poppet valves in some examples. The poppet valves may be configured to execute an oscillating lifting motion during operation of the internal combustion engine and in this way open and close the intake and exhaust ports. Rapid valve opening and large flow cross sections may be used to reduce throttling losses in the inflowing and outflowing gas streams small and to provide filling of the cylinders with fresh mixture and effective discharge of the exhaust gases, if desired.

The engine 50 may also include a boosting device 190. The boosting device 190 is configured to provide boosted air to the cylinders. The boosting device may be a turbocharger or a supercharger and may include a compressor. Arrows 192 represent the flow of intake air from the boosting device to the intake ports for each cylinder and arrow 194 represents the flow of intake air to the boosting device. It will be appreciated that intake conduits may be used to flow air to and from the boosting device. The engine 50 may further include a direct fuel injector 196 coupled to each cylinder.

The engine may further include an intake camshaft 146 and an exhaust camshaft 148. Cams or other suitable valve actuating mechanisms configured to actuate the valves may be coupled to the camshaft. Therefore, one or more of the cams described herein may be a valve actuating mechanism. However, other types of valve actuation have been contemplated, such as electronic valve actuation. The camshafts may be side mounted camshafts and/or overhead camshafts. Furthermore, the camshafts may be mounted in the cylinder head 52.

Specifically, a first intake cam 150 is configured to actuate (e.g., cyclically actuate) the first intake valve 112, a second intake cam 152 is configured to actuate (e.g., cyclically actuate) the second intake valve 114. Additionally, a first exhaust cam 154 is configured to actuate the first exhaust valve 116 and a second exhaust cam 156 is configured to actuate the second exhaust valve 118.

A third intake cam 158 is configured to actuate the first intake valve 120 and a fourth intake cam 160 is configured to actuate the second intake valve 122. A third exhaust cam 162 is configured to actuate the first exhaust valve 124 and a fourth exhaust cam 164 is configured to actuate the second exhaust valve 126.

A fifth intake cam 166 is configured to actuate the first intake valve 128 and a sixth intake cam 168 is configured to actuate the second intake valve 130. A fifth exhaust cam 170 is configured to actuate the first exhaust valve 132 and a sixth exhaust cam 172 is configured to actuate the second exhaust valve 134.

A seventh intake cam 174 is configured to actuate the first intake valve 136 and an eighth intake cam 176 is configured to actuate the second intake valve 138. A seventh exhaust cam 178 is configured to actuate the first exhaust valve 140 and an eighth exhaust cam 180 is configured to actuate the second exhaust valve 142.

The intake camshaft 146 and cams coupled thereto may be included in an intake valve actuating assembly 182. Likewise, the exhaust camshaft 148 and the cams coupled thereto may be included in an exhaust valve actuating assembly 184. Additionally, the intake camshaft 146 and the exhaust camshaft 148 may be coupled to a crankshaft.

An intake valve timing adjustment apparatus 186 may be coupled to the intake camshaft 146. The intake valve timing adjustment apparatus 186 may be configured to advance and retard intake valve timing. Likewise, an exhaust valve timing adjustment apparatus 188 may be coupled to the exhaust camshaft 148. The exhaust valve timing adjustment apparatus 188 may be configured to advance and retard exhaust valve timing. Advancing or retarding valve timing may include adjusting the phase between a crankshaft and a camshaft. Thus, the camshaft may be rotated by a given angle with respect to the crankshaft.

The cylinders (1, 2, 3, and 4) are arranged in an in-line configuration. That is to say that a flat plane extends through the centerline of each of the cylinders. However, other suitable cylinder arrangements have been contemplated.

Each exhaust port in each cylinder may have a separate exhaust gas line extending therefrom. Thus, the exhaust gas lines 7 are in fluidic communication with each associated cylinder and coupled to a corresponding exhaust port.

The exhaust gas lines 7 may be exhaust runners. Additionally, the exhaust gas lines 7 may fluidly converge to form an exhaust manifold 5. Downstream of the manifold the exhaust gases may be optionally supplied to aturbine of an exhaust gas turbocharger and/or to one or more exhaust gas after-treatment systems.

In the depicted example, the exhaust manifold 5 is integrated into the cylinder head 52. However, in other examples the exhaust manifold 5 or a portion of the exhaust manifold may be positioned exterior to the cylinder head 52.

Further in some examples, the engine 50 may be operated with a firing order of 1-3-4-2. That is to say that combustion may be sequentially implemented or initiated in the first cylinder 1, the third cylinder 3, the second cylinder 2, and the fourth cylinder 4. However, other cylinder firing orders have been contemplated.

The exhaust lines merge or converge to form a combined exhaust gas line 9 while forming the exhaust manifold 5. Specifically in the depicted example, the exhaust gas lines 7 of each cylinder are brought together to form partial exhaust gas lines 8 associated with corresponding cylinders before these partial exhaust gas lines 8 open into the combined exhaust gas line 9.

It will be appreciated that when the exhaust manifold 5 is integrated into the cylinder head 52 the length of the exhaust lines are reduced when compared to an exhaust manifold positioned external to the cylinder head. The opening duration between the exhaust valves for each cylinder is varied to reduce cross-talk between the cylinders. That is to say that the likelihood of exhaust gases from a cylinder entering adjacent cylinders during combustion operation is reduced.

Therefore in one example, the two exhaust ports for each cylinder are opened for different durations. That is to say that a first exhaust valve and a second exhaust valve for each cylinder may have different opening lengths.

Further in some examples, the exhaust valve and exhaust port which are oriented towards and closest to the preceding cylinder in the firing order in each case may have a shorter opening duration $\Delta_{short}$, indicated in FIG. 1. This closer exhaust valve may be more effected by combustion and charge exchange in the preceding cylinder. On the other hand, the exhaust valve and exhaust port which are oriented away from and is arranged further from the preceding cylinder in the firing order may be equipped with a longer opening duration $\Delta_{long}$, indicated in FIG. 1. Variation of the exhaust valve timing may reduce fuel consumption.

Further in some examples, the crank angle separation between the sequentially combusted (e.g., ignited) cylinders may be 180 crank angle degrees. Thus, the firing points of the cylinder may be separated by an interval of 180 crank angle degrees. As previously discussed the firing order of the cylinders may be 1-3-4-2.

The following opening durations may be used for the eight exhaust ports and the eight exhaust valves and the four cylinders 1, 2, 3, 4 in one example. The first exhaust port 84 and the first exhaust valve 116 of the first cylinder 1, the first exhaust port 92 and the first exhaust valve 124 of the second cylinder 2, the second exhaust port 102 and the second exhaust valve 134 of the third cylinder 3 and the second exhaust port 110 and the second exhaust valve 142 of the fourth cylinder 4 may have a long opening duration $\Delta_{long}$. The second exhaust port 86 and the second exhaust valve 118 of the first cylinder 1, the second exhaust port 94 and the second exhaust valve 126 of the second cylinder 2, the first exhaust port 100 and the first exhaust valve 132 of the third cylinder 3 and the first exhaust port 108 and the first exhaust valve 140 of the fourth cylinder 4 may have a short opening duration $\Delta_{short}$.

The aforementioned opening durations reduce the likelihood that the fourth cylinder 4 adversely influences the third cylinder 3 preceding it in the firing order, that is, the cylinder 3 previously ignited, during the charge exchange and the likelihood of hot exhaust gas coming from the fourth cylinder 4 and flowing into the third cylinder 3 is reduced (e.g., inhibited). Specifically, the first exhaust port 108 of the fourth cylinder 4, that is, the exhaust port which is oriented towards and is closest to the third cylinder 3 preceding it in the firing order, has the shorter opening duration $\Delta_{short}$, whereas the second exhaust port 110 of the fourth cylinder 4 can be opened longer without disturbing the charge exchange of the third cylinder 3, since this port is oriented away from and is arranged further from the previously ignited third cylinder 3.

FIG. 1 provides for an internal combustion engine comprising a cylinder head including two cylinders arranged in an inline configuration, a first cylinder included in the two cylinders having a first exhaust valve positioned in a first exhaust port and a second exhaust valve positioned in a second exhaust port, each exhaust port in fluidic communication with a separate exhaust gas line, the exhaust gas lines converging downstream forming an exhaust manifold and a valve actuating assembly including a first valve actuating mechanism cyclically actuating the first exhaust valve and a second valve actuating mechanism cyclically actuating the second exhaust valve, where the first valve actuating mechanism opens the first exhaust valve for a different duration of time than the second valve actuating mechanism.

Figure 2:
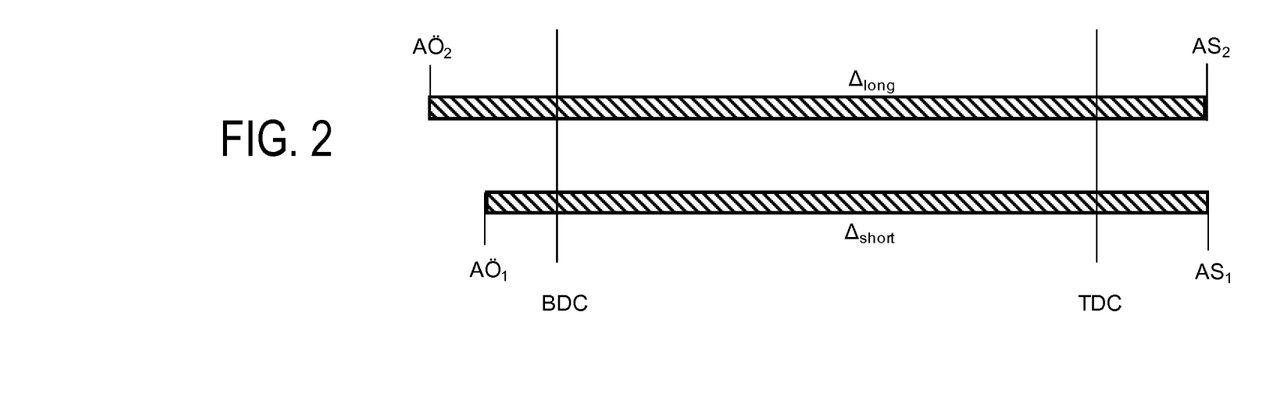
FIG. 2 shows in a chart the timing of the two exhaust ports of a cylinder included in the engine shown in FIG. 1.

FIG. 2 shows in a chart the control times $A\ddot{O}_1$, $A\ddot{O}_2$, $AS_1$, $AS_2$ of the two exhaust ports and exhaust valves of a cylinder shown in FIG. 1. The control times $A\ddot{O}_1$, $A\ddot{O}_2$, $AS_1$, $AS_2$ of the two exhaust ports of the fourth cylinder 4 are represented.

The first exhaust port 108 and corresponding exhaust valve of the fourth cylinder 4 has a short opening duration $\Delta_{short}$. The first exhaust port 108 and corresponding valve opens at control time $A\ddot{O}_1$ and closes at control time $AS_1$. The second exhaust port 110 and the corresponding exhaust valve of the fourth cylinder 4 has a longer opening duration $\Delta_{long}$. The exhaust port 110 and corresponding exhaust valve opens at control time $A\ddot{O}_2$ and closes at control time $AS_2$. The two exhaust ports 108 and 110 of cylinder 4 therefore have the same closing time $AS_1$, $AS_2$, whereas their opening times $A\ddot{O}_1$, $A\ddot{O}_2$ have an offset $\Delta$. In some examples, first and second exhaust valves in one or more of the cylinders may be closed at the same time. In one example, the difference (e.g., offset $\Delta$) between the exhaust valve opening durations of the first and second exhaust valves in one of the cylinders may be greater than 2 crank angle degrees and less than or equal to 10 crank angle degrees. In another example, the difference (e.g., offset $\Delta$) between the valve opening durations of the first and second exhaust valves in one of the cylinders may be greater than 10 crank angle degrees and less than or equal to 15 crank angle degrees. Further in one example, the difference (e.g., offset $\Delta$) between the valve opening durations of the first and second exhaust valves in one of the cylinders may be greater than 15 crank angle degrees and less than or equal to 25 crank angle degrees.

Figure 3:
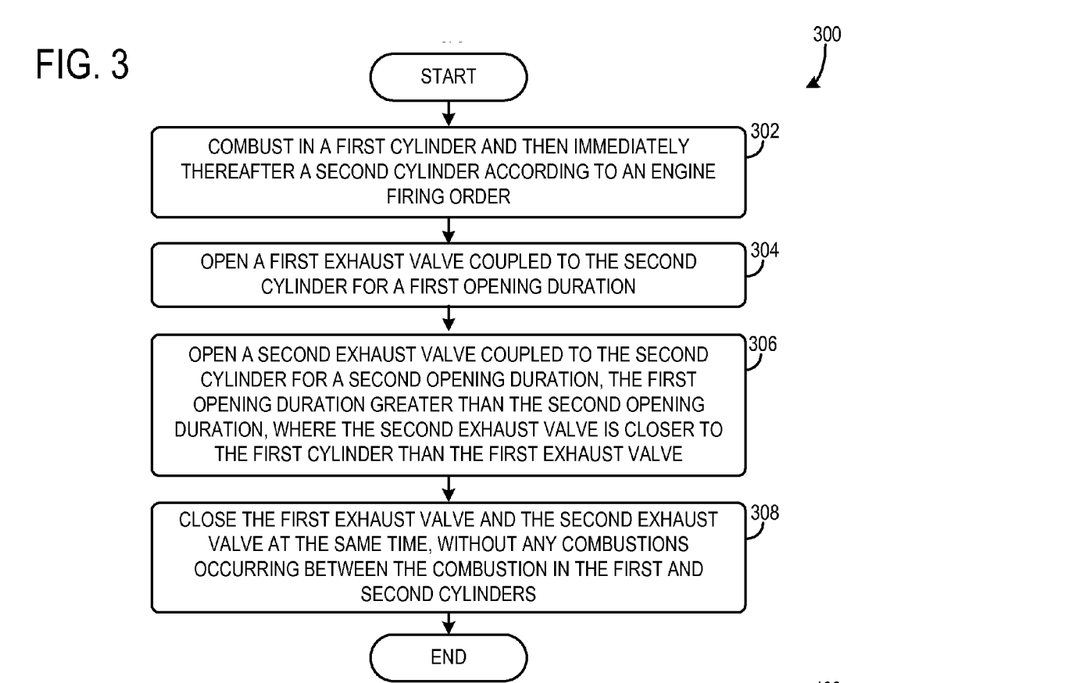
FIGS. 3 and 4 show methods for an internal combustion engine.

FIG. 3 shows a method 300 for an internal combustion engine. Method 300 may be implemented by the engine and components described above with regard to FIGS. 1 and 2 or may be implemented by other suitable engines and components.

The method includes at 302 combusting in a first cylinder and then immediately thereafter a second cylinder according to an engine firing order. At 304 the method includes opening a first exhaust valve coupled to the second cylinder for a first opening duration.

At 306 the method includes opening a second exhaust valve coupled to the second cylinder for a second opening duration, the first opening duration greater than the second opening duration, where the second exhaust valve is closer to the first cylinder than the first exhaust valve. Next at 308 the method includes closing the first exhaust valve and the second exhaust valve at the same time, without any combustions occurring between the combustion in the first and second cylinders. It will be appreciated that in one example the first cylinder is positioned in an inline configuration with the second cylinder.

Figure 4:
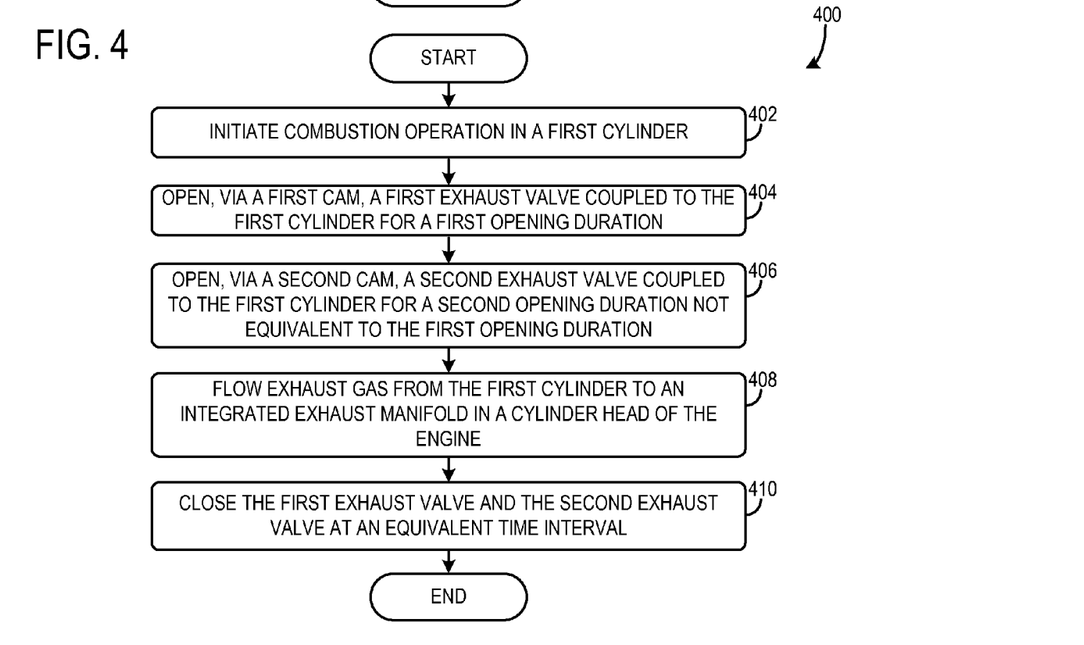

FIG. 4 shows another method 400 for an internal combustion engine. Method 400 may be implemented by the engine and components described above with regard to FIGS. 1 and 2 or may be implemented by other suitable engines and components.

The method includes at 402 initiating combustion operation in a first cylinder. Next at 404 the method includes opening, via a first cam, a first exhaust valve coupled to the first cylinder for a first opening duration. At 406 the method includes opening, via a second cam, a second exhaust valve coupled to the first cylinder for a second opening duration not equivalent to the first opening duration. In one example, the first opening duration is longer than the second opening duration by at least 5% and the first exhaust valve is closer to a precedingly combusted cylinder than the second exhaust valve, the preceding combustion cylinder directly preceding the combustion in the first cylinder in the firing order. In another example, the difference between the first opening duration and the second opening duration is greater than 5 crank angle degrees. At 408 the method includes flowing exhaust gas from the first cylinder to an integrated exhaust manifold in a cylinder head of the engine. At 410 the method includes closing the first exhaust valve and the second exhaust valve at an equivalent time interval.

REFERENCE SYMBOLS

AÖ$_1$ Control time exhaust opens—first exhaust valve
AÖ$_2$ Control time exhaust opens—second exhaust valve
AS$_1$ Control time exhaust closes—first exhaust valve
AS$_2$ Control time exhaust closes—second exhaust valve
° KW Crank angle degrees
TDC Top dead center
BDC Bottom dead center
Δ Offset of the opening times of the two exhaust ports of a cylinder
Δ$_{long}$ Longer opening duration of the exhaust port of a cylinder which is closest to the preceding cylinder in the firing order
Δ$_{short}$ Shorter opening duration of the exhaust port of a cylinder which is arranged further from the preceding cylinder in the firing order Note that the example method included herein can be used with the engine configuration of FIG. 1, or with various other modified engine and/or vehicle system configurations. Various acts, operations, or functions illustrated may be performed in the sequence illustrated, in parallel, or in some cases omitted. Likewise, the order of the methods is not necessarily required to achieve the features and advantages of the example embodiments described herein, but is provided for ease of illustration and description. One or more of the illustrated acts or functions may be repeatedly performed depending on the particular strategy being used.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   directing boosted air from a boosting device to first and second cylinders of an engine;
   combusting in the first cylinder and then immediately thereafter in the second cylinder according to an engine firing order;
   opening a first exhaust valve coupled to the second cylinder for a first opening duration; and
   opening a second exhaust valve coupled to the second cylinder for a second opening duration less than the first opening duration, the second exhaust valve positioned closer to the first cylinder than the first exhaust valve,
   wherein a difference between the first and second opening durations is greater than 2 crank angle degrees and less than or equal to 10 crank angle degrees.

2. The method of claim 1, further comprising closing the first exhaust valve and the second exhaust valve at the same time, without any combustions occurring between the combustion in the first and second cylinders.

3. The method of claim 1, where the first cylinder is positioned in an inline configuration with the second cylinder.

4. The method of claim 1, wherein the first and second cylinders are each at least partially formed via a common cylinder head, the cylinder head include exhaust ports for each of the first and second cylinders merging in the cylinder head forming an exhaust manifold in the cylinder head.

5. The method of claim 4, further comprising operating the first and second exhaust valves via a valve actuating assembly including a first valve actuating mechanism cyclically actuating the first exhaust valve and a second valve actuating mechanism cyclically actuating the second exhaust valve, where the first valve actuating mechanism opens the first exhaust valve for a different duration of time than the second valve actuating mechanism.

6. The method of claim 5, wherein the first and second exhaust valves are closed at a same time.

7. The method of claim 5, where the valve actuating assembly adjusts a phase between a crankshaft and an exhaust camshaft.

8. The method of claim 5, further comprising direct injecting fuel to each of the first and second cylinders via respective first and second direct fuel injectors.

9. The method of claim 4, where the cylinder head forms four cylinders arranged in an inline configuration, and where firing points of the cylinder are separated by an interval of 180 crank angle degrees.

10. The method of claim 1, wherein the difference between the valve opening durations of the first and second exhaust valves is greater than 10 crank angle degrees and less than or equal to 15 crank angle degrees.

11. The method of claim 1, wherein the difference between the valve opening durations of the first and second exhaust valves is greater than 15 crank angle degrees and less than or equal to 25 crank angle degrees.

12. The method of claim 1, wherein the second exhaust valve is closer to a precedingly combusted cylinder in the engine firing order than the first exhaust valve, the precedingly combusted cylinder directly preceding the combustion in the first cylinder in the engine firing order.

13. The method of claim 12, further comprising closing the first exhaust valve and the second exhaust valve at an equivalent time interval.

14. The method of claim 12, where the difference between the first opening duration and the second opening duration is greater than 5 crank angle degrees.

15. The method of claim 12, further comprising flowing exhaust gas from the first cylinder to an integrated exhaust manifold in a cylinder head of the engine.

16. An internal combustion engine, comprising:
   a plurality of cylinders arranged in an inline arrangement, each cylinder having a first exhaust valve and a second exhaust valve; and
   a valve actuating device configured to, after initiating combustion in one of the cylinders, open the first exhaust valve of the cylinder for a different duration of time than the second exhaust valve of the cylinder, the duration of opening of each of the first and second exhaust valves of each cylinder based on distances of the valves to a directly preceding cylinder in an engine firing order.

17. The engine of claim 16, wherein a difference between the opening durations of the first and second exhaust valves of each cylinder depends on a number of cylinders in the plurality of cylinders and lengths of individual exhaust gas lines adjoining exhaust ports of the cylinders.

18. The engine of claim 16, wherein for each cylinder, the valve actuating device is configured to open the exhaust valve which is arranged closer to the directly preceding cylinder in the engine firing order for a shorter duration than the exhaust valve which is arranged further from the directly preceding cylinder in the engine firing order.

* * * * *